(12) United States Patent
Kaul

(10) Patent No.: US 12,206,691 B2
(45) Date of Patent: Jan. 21, 2025

(54) MACHINE LEARNING FOR ANOMALY DETECTION BASED ON LOGON EVENTS

(71) Applicant: Microsoft Technology Licensing, LLC., Redmond, WA (US)

(72) Inventor: Ishna Kaul, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 17/682,594

(22) Filed: Feb. 28, 2022

(65) Prior Publication Data

US 2023/0275915 A1    Aug. 31, 2023

(51) Int. Cl.
*H04L 9/40*    (2022.01)
*G06N 20/00*    (2019.01)

(52) U.S. Cl.
CPC ......... *H04L 63/1425* (2013.01); *G06N 20/00* (2019.01)

(58) Field of Classification Search
CPC ..... H04L 63/1425; H04L 63/08; G06N 20/00; G06N 3/044; G06N 3/045; G06N 3/0464; G06N 3/088; G06N 3/09; G06N 20/10; G06F 21/552
See application file for complete search history.

(56) References Cited

U.S. PATENT DOCUMENTS

| | | | |
|---|---|---|---|
| 2019/0068573 A1* | 2/2019 | Maor | H04L 63/0428 |
| 2019/0207960 A1 | 7/2019 | Chu et al. | |
| 2020/0250477 A1* | 8/2020 | Barthur | G06F 11/0793 |
| 2020/0285737 A1* | 9/2020 | Kraus | G06F 21/552 |
| 2020/0296117 A1* | 9/2020 | Karpovsky | H04L 63/1416 |
| 2020/0412751 A1* | 12/2020 | Thayer | H04L 63/145 |
| 2021/0349979 A1 | 11/2021 | Cohen et al. | |

FOREIGN PATENT DOCUMENTS

| | | | | |
|---|---|---|---|---|
| CN | 108512827 | * | 9/2018 | G06F 18/23213 |
| CN | 108512827 A | | 9/2018 | |

OTHER PUBLICATIONS

Liu, et al., "MLTracer: Malicious Logins Detection System via Graph Neural Network", In Proceedings of 19th International Conference on Trust, Security and Privacy in Computing and Communications, Dec. 29, 2020, pp. 715-726.
"International Search Report and Written Opinion Issued in PCT Application No. PCT/US23/011097", Mailed Date: May 4, 2023, 11 Pages.

* cited by examiner

*Primary Examiner* — Joe Chacko
(74) *Attorney, Agent, or Firm* — Workman Nydegger

(57) ABSTRACT

A computing system receives unlabeled datasets based on logon event data. Various features are extracted based on the unlabeled datasets. A probability score based on the various features is generated by unsupervised machine-learning models that have been trained using the unlabeled datasets. The probability score indicates whether the logon event data is anomalous. The probability score is used to label the unlabeled datasets to thereby generate labeled datasets. The various features are extracted based on the labeled datasets. A contribution score based on the various features is generated by supervised machine-learning models that have been trained using a subset of the labeled datasets. The contribution score specifies which of the various features are likely to have caused the logon event data to be labeled as anomalous. Output data is generated specifying features that likely caused the logon event data to be labeled as anomalous.

20 Claims, 11 Drawing Sheets

MACHINE LEARNING FOR ANOMALY DETECTION BASED ON LOGON EVENTS

BACKGROUND

In computing networks, it is generally required for devices to logon to the computing network in order to access the functionalities and services provided by the network. Since some computing networks such as a network for a large corporation or other entities can be large, such computing networks will have a large number of users and their associated devices logging onto the network. Unfortunately, some of these logons may initiated by a malicious user who desires to cause a malicious act on the network such as fraudulently imitating a valid network user. In many cases, these malicious users cause an anomaly to occur in the logon process.

To guard against malicious users, many computing networks employ various anomaly detection schemes that attempt to detect any anomalies for a given logon event. However, many of the anomaly detection schemes require large amounts of historical data that is used as a comparison to determine if a given logon event should be considered anomalous. This often requires large amounts of computing resources such as memory and processing in order to use the historical data.

In addition, there are often many logon anomalies that are detected for a given logon event that are for benign reasons. For example, a new user or a new device may logon to the computing network for the first time and this may cause an anomaly since there would not be a historical record of such logon. Thus, the anomaly detection schemes often require that the benign anomalies be investigated to ensure that they are not malicious since there is no easy way to focus such investigation onto those logon events that are likely to be malicious. Again, this may require large amounts of time as well as computing resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments disclosed herein solve the problems discussed above. For example, the embodiments disclosed herein provide for training an unsupervised machine-learning model acting as an anomaly detector with unlabeled data so that the anomaly detection occurs without the need for large amounts of historical training data, thus saving on computing resources. In addition, the unsupervised machine-learning model is able to generate labeled data that labels a logon event as being anomalous or not and that can then be used as training data for a supervised machine-learning model. Again, this prevents the need for large amounts of historical training data. In addition, the supervised machine-learning model is able use the labeled data to determine which features related to the logon event are likely to have caused the logon event to be anomalous. Determining those features likely to have caused the anomaly in the logon event is able to focus any subsequent investigation of whether the anomaly is malicious or benign. This is turn save time and computing resources since those features not likely to have caused the anomaly do not have to be investigated. Further, if the features that are likely to have caused the anomaly are of a type that is likely not malicious, then the investigation may not need to occur at all.

One embodiment is related to a computing system including an unsupervised machine-learning model that receives unlabeled logon event data and generates labeled data indicative of an anomaly and a supervised learning-model that uses this labeled data as input to determine features related to the logon event data that cause instances of the logon data to be labeled as anomalous. The computing system receives unlabeled datasets based on instances of logon event data received from various devices. Various features are extracted based on the unlabeled datasets. A probability score based on the various features is generated, using unsupervised machine-learning models that have been trained using a subset of unlabeled datasets. The probability score indicates whether an instance of the logon event data is anomalous. The probability score is used to label the unlabeled datasets to thereby generate labeled datasets that are based on the instances of the logon event data. The various features are extracted based on the one or more labeled datasets. A contribution score based on the various features is generated, using supervised machine-learning models that have been trained using a subset of the labeled datasets. The contribution score specifies which of the various features are likely to have caused the instance of the logon event data to be labeled as anomalous. Output data is generated based on the various features that are likely to have caused the instance of the logon event data to be labeled as anomalous.

In some embodiments, the output data is used to determine if the logon event data that has been labeled as anomalous is malicious or benign. In some embodiments, the various features comprise one or more of (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, (14) a location from where the logon occurs, or (15) whether a new IP host or service was used at the logon time.

In some embodiments, the output data comprises a visualization that shows a visual indication of how likely each feature is to have caused the instance of the logon event data to be labeled as anomalous or shows instances of anomalous and non-anomalous logon event data. In some embodiments, the visual indication is one of a cluster graph or a bar graph.

In some embodiments, each instance of a logon event data is associated with a single user identification. In other embodiments, the devices are associated with a single user identification. In still other embodiments, devices are associated with multiple user identifications.

Another embodiment is related to a computing system including an unsupervised machine-learning model that receives unlabeled logon event data and generates labeled data indicative of an anomaly and a supervised learning-model that uses the labeled data as input to determine features related to the logon event data that cause instances of the logon data to be labeled as anomalous. The computing system obtains unlabeled training datasets based on instances of logon event data received from various devices. Various features based on the unlabeled training datasets are extracted. An unsupervised machine-learning model is trained using the unlabeled training datasets to configure the unsupervised machine-learning model to generate a probability score based on the features. The probability score indicates whether an instance of the logon event data is anomalous. Labeled training datasets are obtained that are based on the instances of the logon event data that have been labeled by the probability score of the unsupervised machine-learning model. Various features based on the labeled training datasets are extracted. A supervised machine-learning model is trained using the labeled training datasets to configure the supervised machine-learning model to generate a contribution score based on the features. The contribution score specifies which of the plurality of features are likely to have caused the instance of the logon event data to be labeled as anomalous.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The embodiments disclosed herein solve the problems discussed above. For example, the embodiments disclosed herein provide for training an unsupervised machine-learning model acting as an anomaly detector with unlabeled data so that the anomaly detection occurs without the need for large amounts of historical training data, thus saving on computing resources. In addition, the unsupervised machine-learning model is able to generate labeled data that labels a logon event as being anomalous or not and that can then be used as training data for a supervised machine-learning model. Again, this prevents the need for large amounts of historical training data. In addition, the supervised machine-learning model is able use the labeled data to determine which features related to the logon event are likely to have caused the logon event to be anomalous. Determining those features likely to have caused the anomaly in the logon event is able to focus any subsequent investigation of whether the anomaly is malicious or benign. This is turn save time and computing resources since those features not likely to have caused the anomaly do not have to be investigated. Further, if the features that are likely to have caused the anomaly are of a type that is likely not malicious, then the investigation may not need to occur at all.

Figure 1:
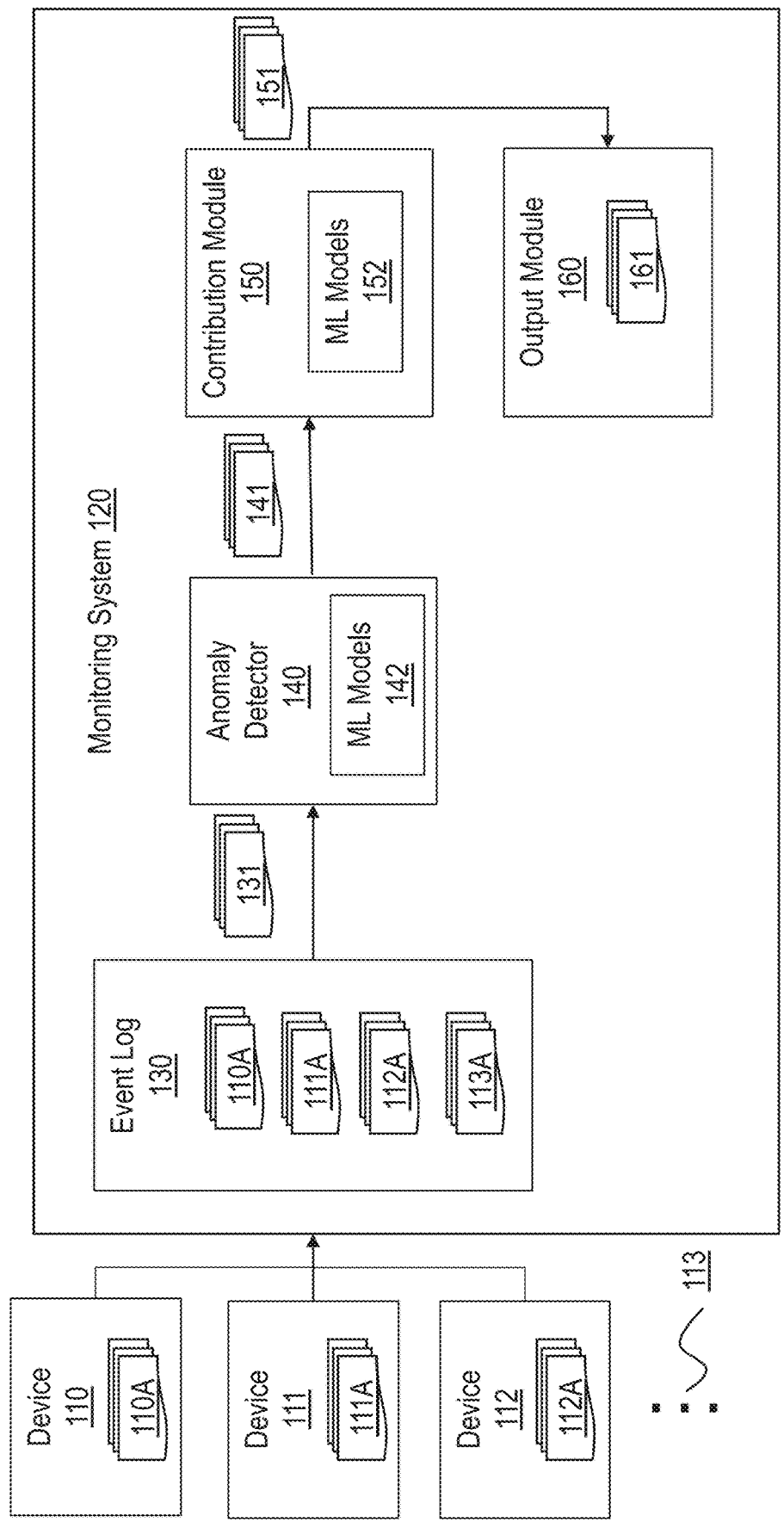
FIG. 1 illustrates an example network that implements the embodiments described herein.

FIG. 1 illustrates an example network 100 that implements the principles described herein. As illustrated in FIG. 1, the network 100 includes a monitoring system 120 that is configured to monitor logon events received from various devices as the devices log onto the network 100. Based on the monitoring of the logon events, the monitoring system 120 is able to determine if any of the received events are anomalous and is able to provide information regarding which features related to the received logon events are likely to have caused the anomaly. This information may then be used to investigate if any of the anomalous events are indicative of a malicious actor or intent or are simply a benign anomaly. This process will be described in more detail to follow.

As illustrated, various devices 110, 111, 112, and any number of additional devices as illustrated by the ellipses 113 are coupled to the monitoring system 120. The devices 110-113 may be device such as a laptop computer, a desktop computer, or a mobile device that is capable of logging onto or off of the network 100. Each of the devices 110-113 may be associated with a different user identification (ID), such as an email address, password, company or organization name, IP address, or other identifier that uniquely identifies the user or owner of the device or the device itself. Alternatively, a single user ID may be associated with more than one of the devices, for example when a user uses the same user ID for both a laptop computer and a mobile device. The users associated with the IDs may be human users or they may be an organization or service or some other non-human user.

In operation, the device 110 provides logon event data 110A to the monitoring system 120, the device 111 provides logon event data 111A to the monitoring system 120, and the device 112 provides logon event data 112A to the monitoring system 120. In addition, any of the additional devices 113 may provide logon event data 113A to the monitoring system 120. The logon event data may be a dataset that associates the user ID of the relevant device with a specific instance of a logon event that occurs for that device. In other words, every time that that one of the devices 110-113 logs onto or logs off from the network 100, logon event data is generated for that logon event. Thus, depending on how the user IDs are associated with the devices 110-113, each instance of the logon event data may be associated with a single user ID or it may be associated with multiple user IDs. As will be described in more detail to follow, each instance of a logon event is associated with various features that describe or give context to the logon event.

The logon event data 110A, 111A, 112A and potentially 113A is received by an event log or store 130. The logon event data may be stored in the event log 130 for a short amount of time. In some embodiments, this amount of time may be 12 hours, while in other embodiments the amount of time may be for less than 12 hours. In some embodiments, the logon event data may be stored in the event log 130 for only a small number of minutes, so that any further processing of the logon event data appears as almost in real time.

As shown in FIG. 1, the monitoring system 120 includes an anomaly detector 140. In one embodiment, the anomaly detector 140 receives the logon event data from the event log 130 as shown at 131 and detects anomalous instances of a logon event using one or more machine-learning models 142. In other embodiments, the logon event data 110A, 111A, 112A and potentially 113A may be received by the anomaly detector 140 directly from the devices 110-113. The one or more machine-learning models 142 are trained on at least a subset of the logon event data 131 received from the event log 130 or a subset of the logon event data received directly from the devices 110-113.

The logon event data received at the anomaly detector 140 is considered unlabeled or unsupervised data. That is, since there has been no prior labeling of the logon event data by either a human actor or a computerized system, the logon event data includes no ground truth labeling. Thus, the one or more machine-learning models 142 are considered unsupervised machine learning models as they perform the anomaly detection. In the embodiments disclosed herein, the use of unlabeled or unsupervised data as training data for the one or more machine-learning models 142 advantageously provides the technical benefit of not having to have a large data store for a large amount of labeled or supervised data. Rather, as previously discussed, the anomaly detector 140 is able to use the one or more machine-learning models 142 on recently obtained logon event data to determine anomalies. Thus, computing processing and storage resources are saved. The training and use of the anomaly detector 140 will be described in more detail to follow.

The anomaly detector 140 uses the unlabeled or unsupervised data 131 and labels each instance of the logon event data as either an anomaly or as normal (i.e., not anomalous). The anomaly detector 140 then generates labeled data 141 that includes the label for each of the instances of the logon event data.

The monitoring system 120 includes a contribution module 150. The labeled data 141 is provided to a contribution module 150. In operation, the contribution module 150 determines which features related to the received logon events included in the labeled data 141 are likely to have caused an instance of the logon event data to be labeled as an anomaly or as normal using one or more machine-learning models 152. As mentioned, the labeled data 141 is labeled data because the anomaly detector 140 has labeled each instance of the logon event data. Thus, the training of the one or more machine-learning models 152 are considered supervised learning models as they use labeled data as training data. The training and use of the contribution module 150 will be described in more detail to follow.

It will be appreciated that having the labeled data that is generated by the anomaly detector 140 be used by the contribution module 150 provides the technical benefit of having labeled data for use in near real time. In other words, there is not a need to generate and store previously labeled data to train the one or more machine-learning models 152. Rather, the contribution module 150 receives the labeled data 141 directly from the anomaly detector 140 as it is generated and is then able to use this labeled data to train the one or more machine-learning models 152 to determine the contribution of each feature as will be explained in more detail to follow.

The contribution module 150 generates contribution data 151 that specifies which features related to the received logon events included in the labeled data 141 are likely to have caused an instance of the logon event data to be labeled as an anomaly. The contribution data 151 is then provided to an output module 160 of the monitoring system 120. The output module 160 uses the contribution data 151 to generate output data 161 that lists each instance of the logon event data as an anomaly or as normal and/or lists the contribution of each feature to the determination of the logon event as being anomalous. In some embodiments, the output data 161 may be a visualization that provides this information in a manner that is easily understood by either a human user or a computing system.

The output data 161 focuses any investigation by either a human user or a computing system of what features caused an anomaly to occur. For example, in an embodiment where there are 60 features related to each instance of a logon event, there may only be three or four of these features that had any effect on whether the logon event was labeled as an anomaly or as normal. By showing this in the output data 161, the human user or to the computing system need only focus an investigation on the three or four features that likely caused the anomaly to occur. If these features are indicative of a benign anomaly, then the investigation can quickly end. However, if the features indicate a malicious anomaly, then further investigation can be performed as needed. It will be appreciated that the focusing of the investigation provides a technical benefit of saving on time and computing resources as only a small number of the features need be investigated. Without such focusing, a human user or computing system would likely have to investigate all features, thus wasting time and computing resources on the many features that likely have no effect of whether the instance of the logon event was labeled as an anomaly or as normal.

For example, in one instance an instance of a logon event data may be labeled as anomalous because the number of logon attempts was remarkably high compared to the number of logon attempts of the other instances of the logon event data. Thus, the feature related to logon attempts may show as part of the output data 161 to be the cause of the anomaly. If the cause of the large number of logon attempts was because a user was reimaging his or her device and so needed a large number of logons, then this would be a benign anomaly. However, if the cause was because a malicious actor was trying to log into the network 100 with a stolen device, then this would be a malicious anomaly. By focusing the investigation onto the feature related to the number of logon attempts, it is likely that a determination of a benign or malicious anomaly can be determined more quickly than if the investigation was focused on all related features. In some embodiment, if the feature related to logon attempts was of a type that is known to be likely benign, then it may be possible that no further investigation is needed.

Figure 2:
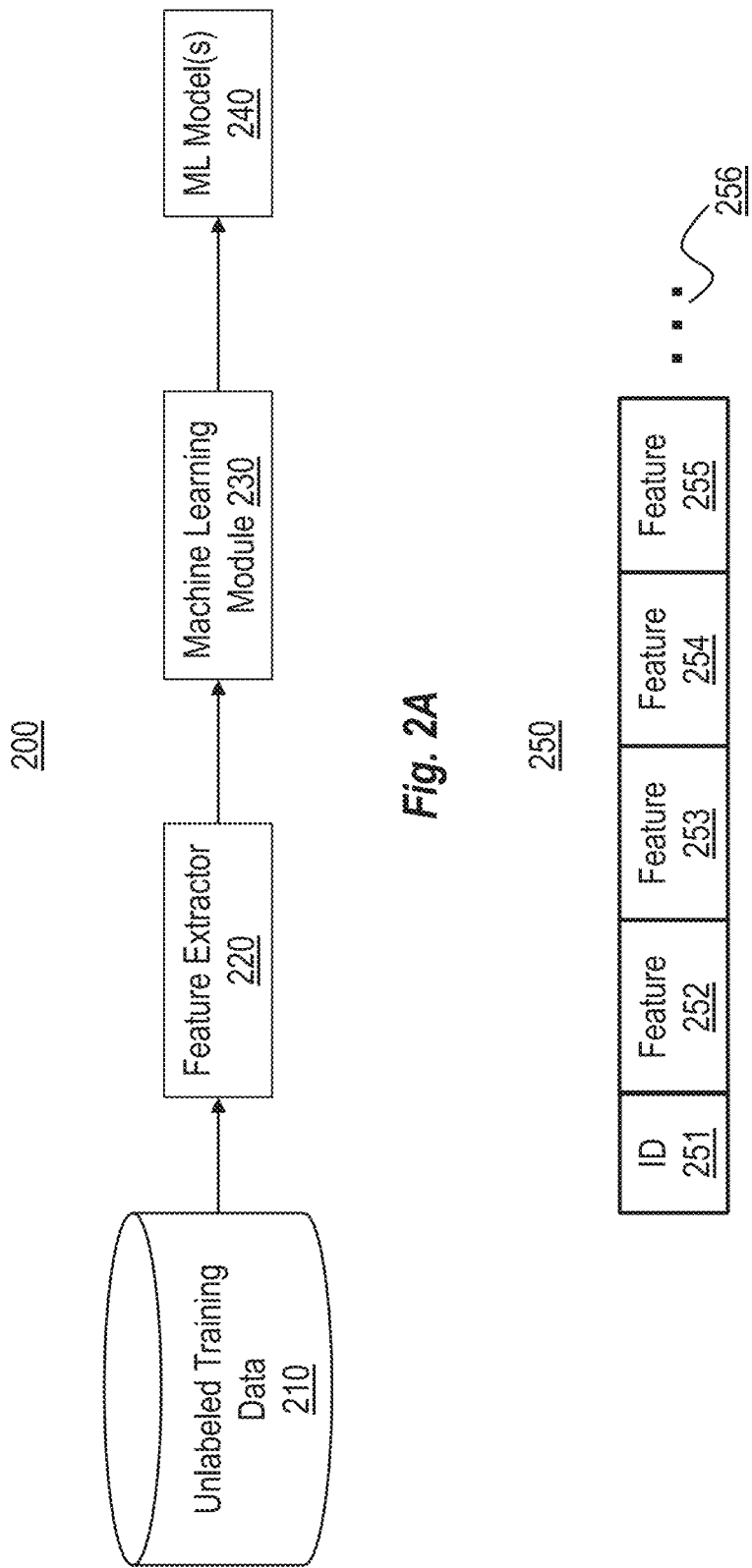
FIG. 2A illustrates an example machine-learning network configured to train one or more machine learning models for detecting anomalous logon event data.
FIG. 2B illustrates an example data structure for unlabeled logon event data.

FIG. 2A illustrates an example machine-learning network 200 configured to train one or more machine-learning models 240, which corresponds to the one or more machine-learning models 142 in FIG. 1. The training is performed by a computing system that may or may not be the same computing system that provides the monitoring system 120 in FIG. 1. Unlabeled training data 210 includes at least a subset of the logon event data received from the event log 130 (i.e., 131) or directly from one or more of the devices 110-113. The unlabeled training data 210 is processed by a feature extractor 220 configured to extract a plurality of features that are related to the logon event data. For example, for each instance of the logon event data, a plurality of features that describe or give context to the logon event data are extracted based on the training data.

In some embodiments, there may be any number of features that are associated with the logon event data. For example, in one embodiment the features may include, but are not limited to, (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, (14) a location from where the logon occurs, or (15) whether a new IP host or service was used at the logon time. It will be noted that the above listed features are just some of the numerous types of features that may be associated with the logon event data. Accordingly, the types and number of features associated with the logon event data may change as circumstances warrant and is not to be used to limit the embodiments disclosed herein.

FIG. 2B illustrates an embodiment of a data structure 250 for a given instance of the logon event data 110A-113A that can be used as the unlabeled training data 210. As illustrated, the data structure 250 includes an ID 251 of the device 110-113 that generated the instance of the logon event data. The data structure 250 also includes a feature 252, a feature 253, a feature 254, a feature 255, and any number of additional features as illustrated by the ellipses 256. The features 252-256 correspond to the features discussed above. It will be noted that the data structure 250 is only one of numerous data structures that may be implemented by the embodiments disclosed herein.

The machine learning module 230 is then configured to analyze the plurality of features to train the one or more machine-learning models 240. The one or more machine-learning models 240 are trained to detect anomalous instances of the logon event data. For example, for a given logon instance, the one or more machine-learning models 240 are configured to determine a probability that the given logon instance is anomalous compared to the other logon event data contained in the unlabeled training data 210.

In some embodiments, for each features, a separate anomaly detection model is trained. As such, multiple machine-learning models may be trained to detect anomalous instances of the logon event data. Different machine-learning techniques may be implemented. In some embodiments, clustering-based anomaly detection techniques are used to train a model to detect a distance between the anomalous instances of the logon event data and normal instances of the logon event data. In some embodiments, are used a model is trained to detect whether new instances the logon event data is within one or more clusters. Many different machine-learning algorithms may be used to train the models, including (but not limited to) convolutional neural networks, multilayer neural networks, recursive neural networks, deep neural networks, logistic regression, isolation forest, k-nearest neighbors, support vector machines (SVM), density-based algorithm, elliptic envelope, local outlier factor, Z-score, Boxplot, statistical techniques, time series techniques, or any other reasonable machine-learning algorithms.

Figure 3:
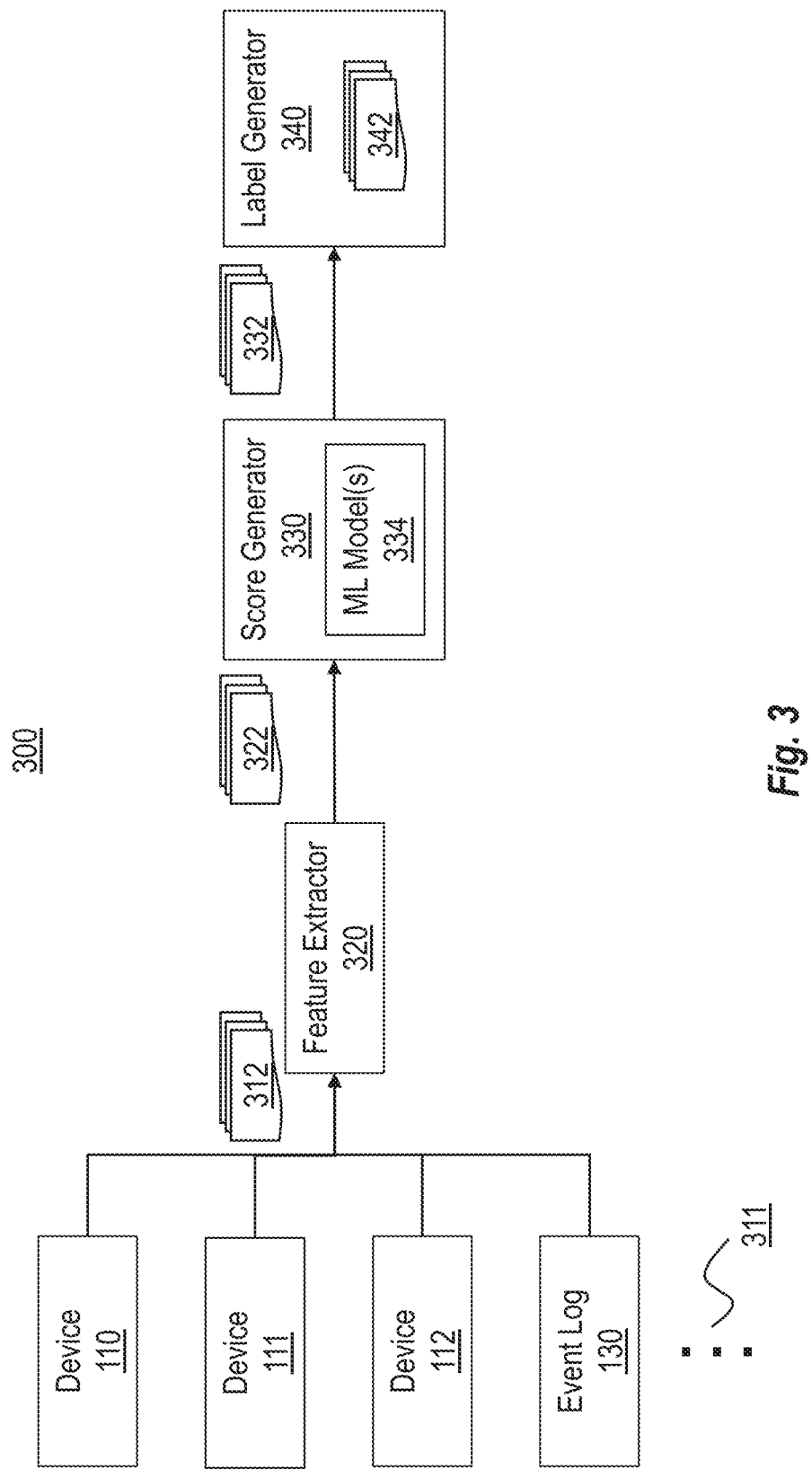
FIG. 3 illustrates an example architecture of the anomaly detector of FIG. 1.

The trained one or more machine-learning models 240 can then be used by the anomaly detector 140 for detecting anomalous instances of the logon event data at the monitoring system 120. FIG. 3 illustrates an example architecture of an anomaly detector 300, which corresponds to the anomaly detector 140 in FIG. 1. As illustrated in FIG. 3, the anomaly detector 300 includes a feature extractor 320, which may correspond to the feature extractor 220, configured to obtain one or more logon event datasets 312, which may correspond to instances of the logon event data 110A-113A and may have a data structure such as the data structure 250. The one or more logon event datasets 312 can be obtained from at least one of (1) the device 110, (2) the device 111, (3) the device 112, and/or (4) event log 130. The ellipsis 311 represents that there may be additional sources from which the feature extractor 320 may obtain the one or more logon event datasets 312, such as the additional devices 113.

In response to receiving the logon event data 110A-113A, the feature extractor 320 is configured to extract a plurality of features 322 from the one or more logon event datasets 312. The plurality to features 322 correspond to the features 252-256.

The extracted plurality of features 322 are then fed into a score generator 330. The score generator 330 embodies one or more machine-learning models 334 that correspond to the machine-learning models 240 of FIG. 2A that have been trained in the manner previously described. The one or more machine-learning models 334 is configured to generate a probability score 332, indicating a probability that a given instance of the logon event data is anomalous.

Figure 4:
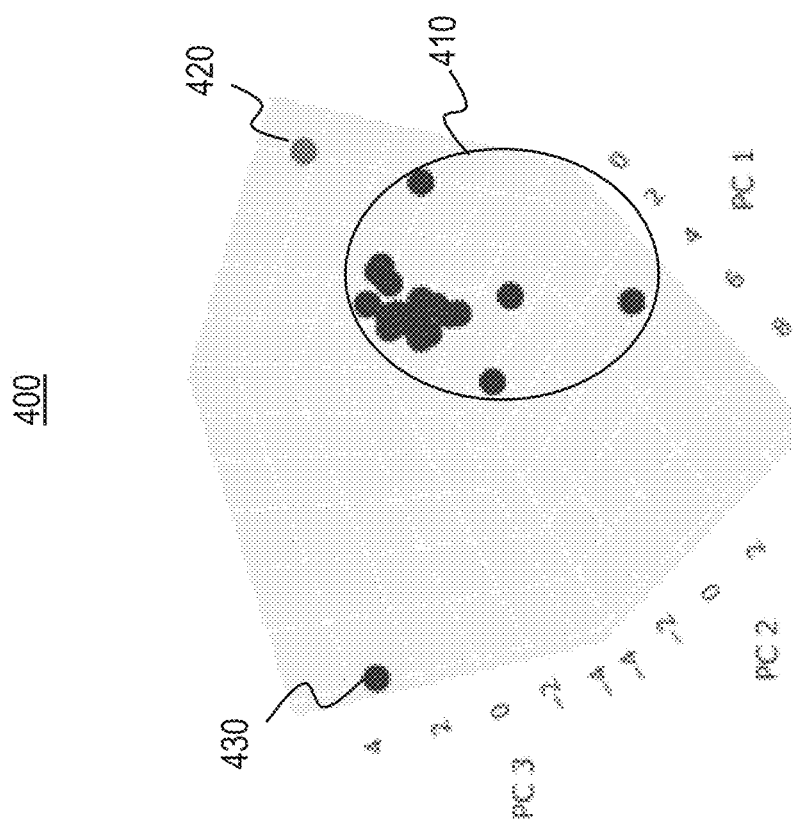
FIG. 4 illustrates an example of a cluster graph of multiple instances of logon event data.

In one embodiment, the probability score 332 may be based a distance between the anomalous instances of the logon event data and normal instances of the logon event data as shown in a cluster. For example, FIG. 4 shows a cluster graph 400 as a visualization that shows multiple instances of logon event data, such as the logon event data 110A-113A. As shown in the figure, the majority of the logon events are close to each other as indicated by the circle 410. However, a logon event instance 420 and a logon instance 430 are some distance from the circle 410. Using this distance, the score generator 330, using the machine learning models 334, generates a probability score 332 for those logon event instances within the circle 410 that indicates that they are normal since they are located relatively close together. In addition, the score generator 330, using the machine learning models 334, generates a probability score 332 for the logon event instance 420 and a logon instance 430 that indicates that they are anomalous since they have a relatively large distance from the circle 410. It will be appreciated that the example shown in FIG. 4 is only one of many different ways that score generator 330, using the machine learning models 334, may generate the probability score 332.

The probability score 332 is then processed by a label generator 340. In some embodiments, when the probability score 332 for a given logon event instance is less than a predetermined threshold, the label generator 340 labels that logon event instance as a "normal". Conversely, when the probability score 332 for a given logon event instance is greater than the predetermined threshold, the label generator 340 labels that logon event instance as a "anomalous". Accordingly, the label generator 340 generates labeled data 342 that corresponds to the labeled data 141 for each instance of the logon event data. As discussed previously in relation to the labeled data 141, the labeled data 342 labels each instance of the logon event data as being an anomaly or as being normal.

Figure 5A:
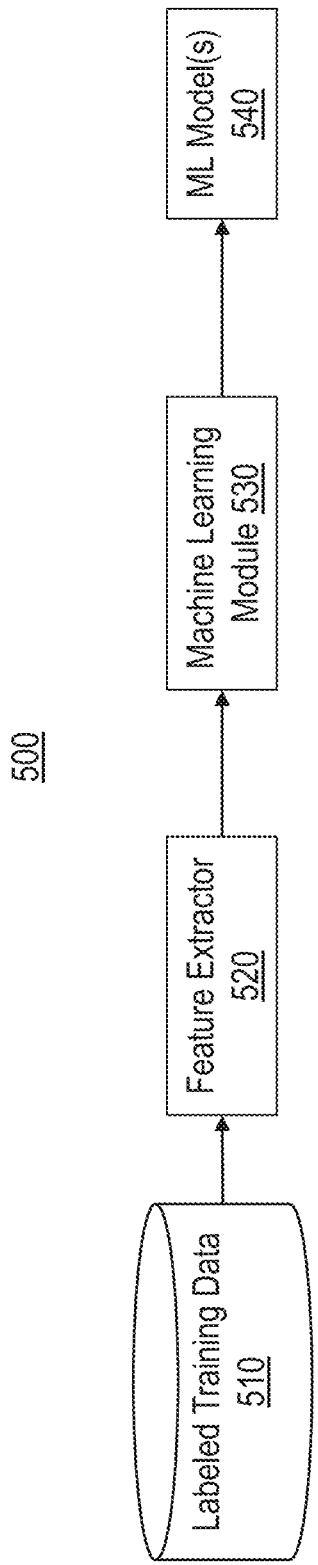
FIG. 5A illustrates an example machine-learning network configured to train one or more machine learning models for determining factors likely to cause logon event data to be anomalous.

FIG. 5A illustrates an example machine-learning network 500 configured to train one or more machine-learning models 540, which corresponds to the one or more machine-learning models 152 in FIG. 1. The training is performed by a computing system that may or may not be the same computing system that provides the monitoring system 120 in FIG. 1. Labeled training data 510 includes at least a subset of the labeled data 141 received from the anomaly detector 140. The labeled training data 510 is processed by a feature extractor 520 configured to extract a plurality of features that are related to the logon event data as previously described. Accordingly, the plurality of features may correspond to those discussed previously in relation to machine-learning network 200.

Figure 5B:
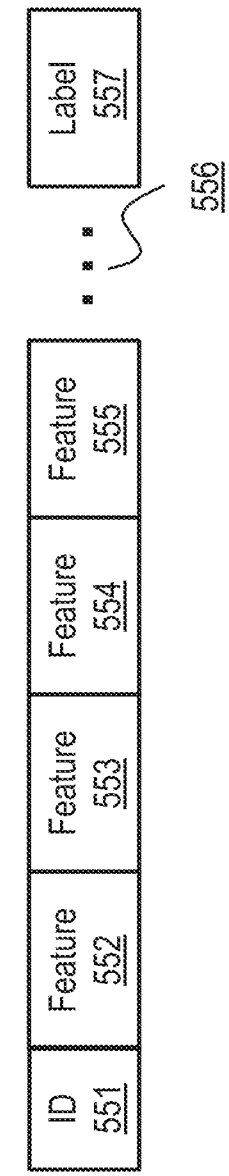
FIG. 5B illustrates an example data structure for labeled logon event data.

FIG. 5B illustrates an embodiment of a data structure 550 for a given instance of the labeled data 141 that can be used as the labeled training data 510. As illustrated, the data structure 550 includes an ID 551 of the device 110-113 that generated the instance of the logon event data. The data structure 550 also includes a feature 552, a feature 553, a feature 554, a feature 555, and any number of additional features as illustrated by the ellipses 556. The features 552-5 correspond to the features discussed previously. In addition, the data structure 550 includes a label 557 that labels the data structure. In the embodiments disclosed herein, the label 557 indicates if the instance of the logon event data is anomalous or is normal, that is not anomalous. It will be noted that the data structure 550 is only one of numerous data structures that may be implemented by the embodiments disclosed herein.

The machine learning model 530 is then configured to analyze the plurality of features to train the one or more machine-learning models 540. The one or more machine-learning models 540 are trained to determine to determine a contribution score for each of the extracted features to the label given to the instance of the logon event data. In other words, a score is determined that specifies which features are likely to have caused an instance of the logon event data to be labeled as an anomaly or as normal.

In some embodiments, for each features, a separate contribution model is trained. As such, multiple machine-learning models may be trained to determine the contributions of the various features. Many different machine-learning algorithms may be used to train the models, including (but not limited to) convolutional neural networks, multilayer neural networks, recursive neural networks, deep neural networks, logistic regression, isolation forest, k-nearest neighbors, support vector machines (SVM), density-based algorithm, elliptic envelope, local outlier factor, Z-score, Boxplot, statistical techniques, time series techniques, or any other reasonable machine-learning algorithms.

Figure 6:
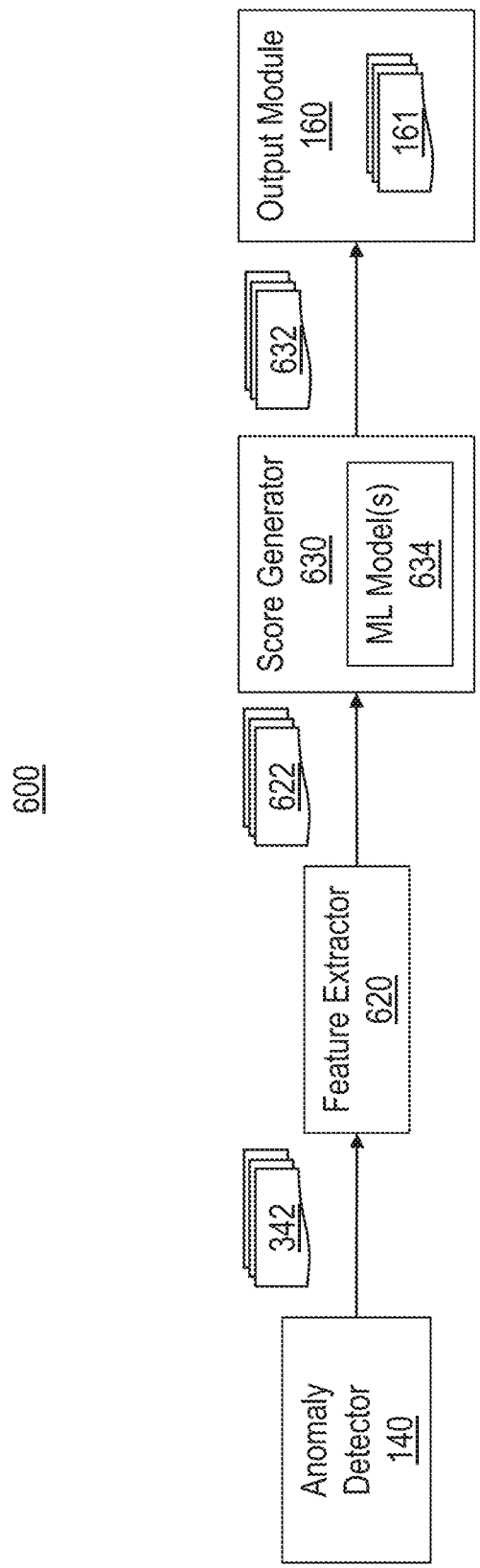
FIG. 6 illustrates an example architecture of the contribution module of FIG. 1.

The trained one or more machine-learning models 540 can then be used by the contribution module 150 for determining the contribution score for each of the extracted features to the label given to the instance of the logon event data. FIG. 6 illustrates an example architecture of a contribution module 600, which corresponds to the contribution module 150 in FIG. 1. As illustrated in FIG. 6, the contribution module 600 includes a feature extractor 620, which may correspond to the feature extractor 520, configured to obtain labeled datasets 612, which may correspond to instances of the logon event data 110A-113A and may have a data structure such as the data structure 550. The one or more labeled datasets 312 are obtained from the anomaly detector 140.

In response to receiving the one or more labeled datasets 312, the feature extractor 620 is configured to extract a plurality of features 622 from the one or more labeled datasets 312. The plurality to features 622 correspond to the features 552-556.

The extracted plurality of features 322 are then fed into a score generator 630. The score generator 630 embodies one or more machine-learning models 634 that correspond to the machine-learning models 540 of FIG. 5A that have been trained in the manner previously described. The one or more machine-learning models 634 is configured to generate a contribution score 632, indicating which features are likely to have caused an instance of the logon event data to be labeled as an anomaly or as normal. In one embodiment, the contribution score 632 is a measure of the contributing factors that cause an instance of logon event data to differ from or be similar to other instances of logon event data from a cluster graph such as the cluster discussed in relation to FIG. 4.

Figure 7:
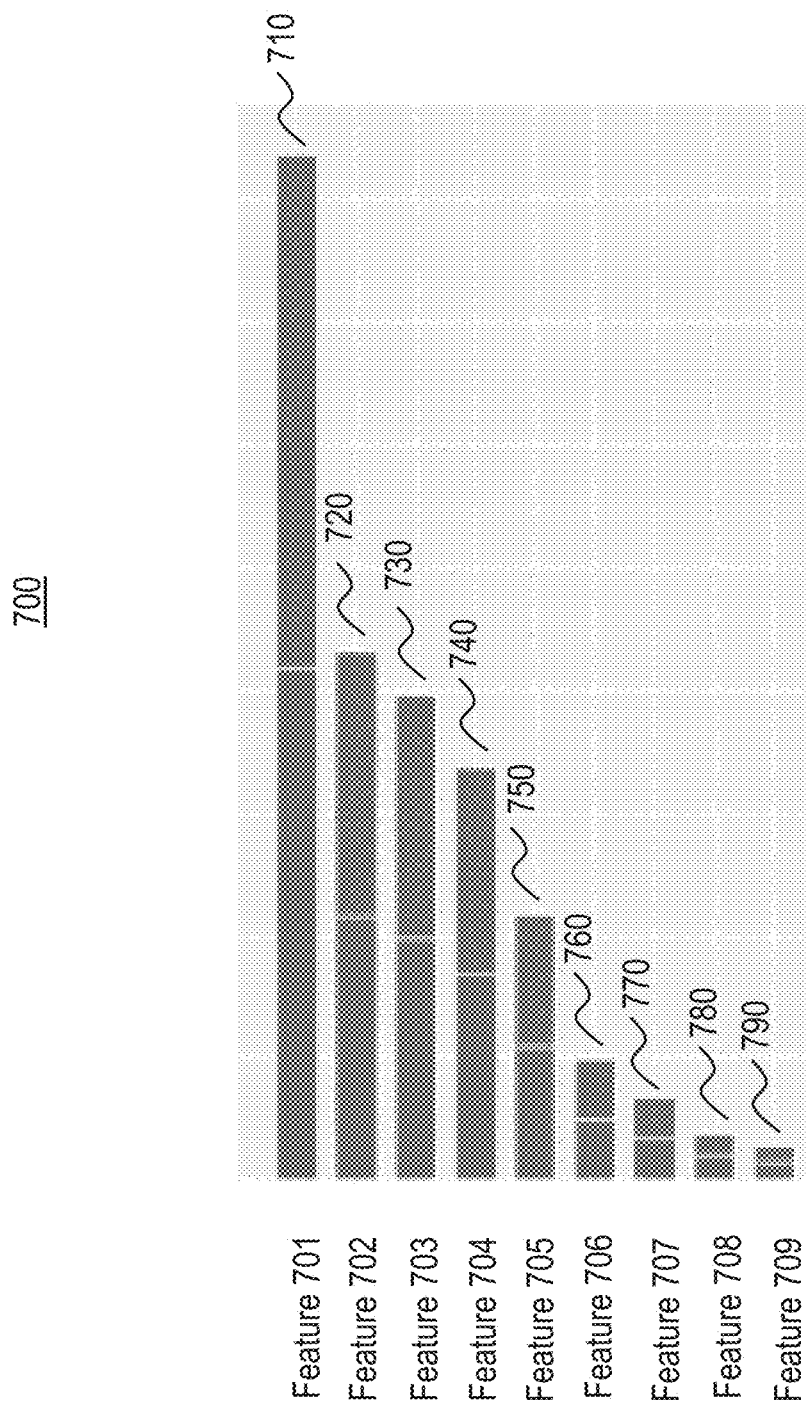
FIG. 7 illustrates an example visualization of factors likely to cause logon event data to be anomalous.

The contribution score 632 is then processed by the output module 160, which generates the output data 161. In some embodiments, the output data 161 is shown as a visualization that lists the contribution of each feature to the determination of the logon event as being anomalous or not. FIG. 7 illustrates an embodiment of a visualization 700. As illustrated the visualization 700 lists features 701-709, which correspond to the features previously discussed. As also illustrated, each of the features 701-709 is associated with a visual indication of how likely each of the features 701-709 is to have caused an instance of the logon event data to be labeled as an anomaly. In the disclosed embodiment, the visual indication is a bar graph. For example, feature 701 is associated with the bar graph 710, feature 702 is associated with the bar graph 720, feature 703 is associated with the bar graph 730, feature 704 is associated with the bar graph 740, feature 705 is associated with the bar graph 750, feature 706 is associated with the bar graph 760, feature 707 is associated with the bar graph 770, feature 708 is associated with the bar graph 780, and feature 709 is associated with the bar graph 790.

As can be seen from the FIG. 7, features 701-704 have the greatest contribution to the logon event data being anomalous. Advantageously, a human user or a computing system is able to focus any further investigation of an anomaly on the features 7-1-704 since these features are the mostly likely to have caused the anomaly to be detected. In other words, the visualization 700 provides a starting point for the further investigation that avoids the need to look at all the features, thus saving time and computing resources.

Figure 8:
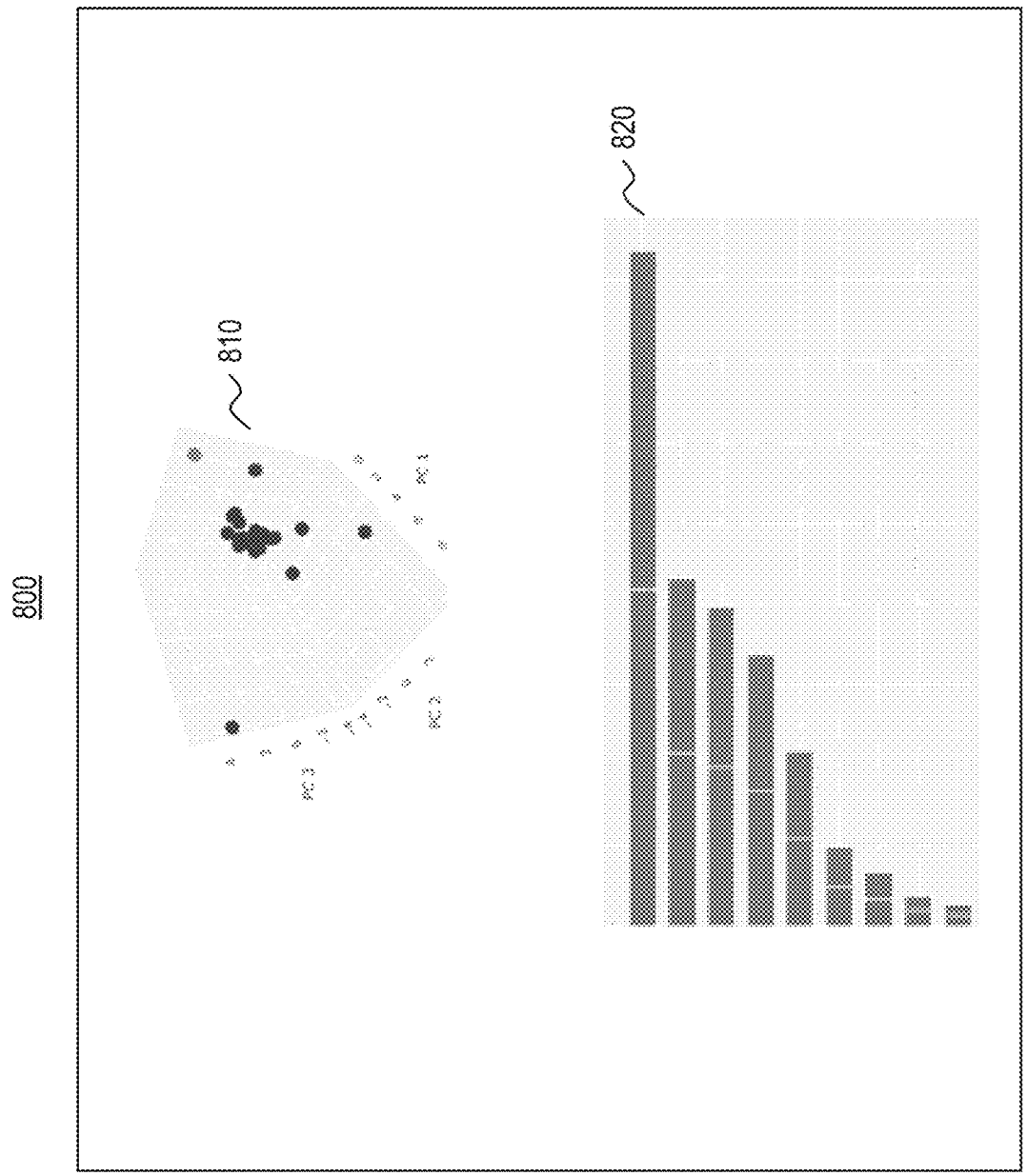
FIG. 8 illustrates an example visualization of a cluster graph and factors likely to cause logon event data to be anomalous.

FIG. 8 illustrates an alternative embodiment of a visualization 800 of the output data 161. As illustrated, the visualization 800 includes a visualization of a cluster graph 810 that corresponds to the cluster graph 400 described in relation to FIG. 4 and thus need not be described in further detail. In addition, the visualization 800 includes a visualization 820 showing features and related bar graphs that corresponds to the visualization 700 discussed in relation to FIG. 7 and thus need not be described in further detail. The visualization 800 is advantageous as it allows a human user or a computing system to view both the data that caused an instance of a logon event data to be labeled as an anomaly or as normal and to see the contributions from each of the features to that label in one view. It will be noted that the visualizations 700 and 800 are only examples of the many different types of visualizations of the output data 161.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
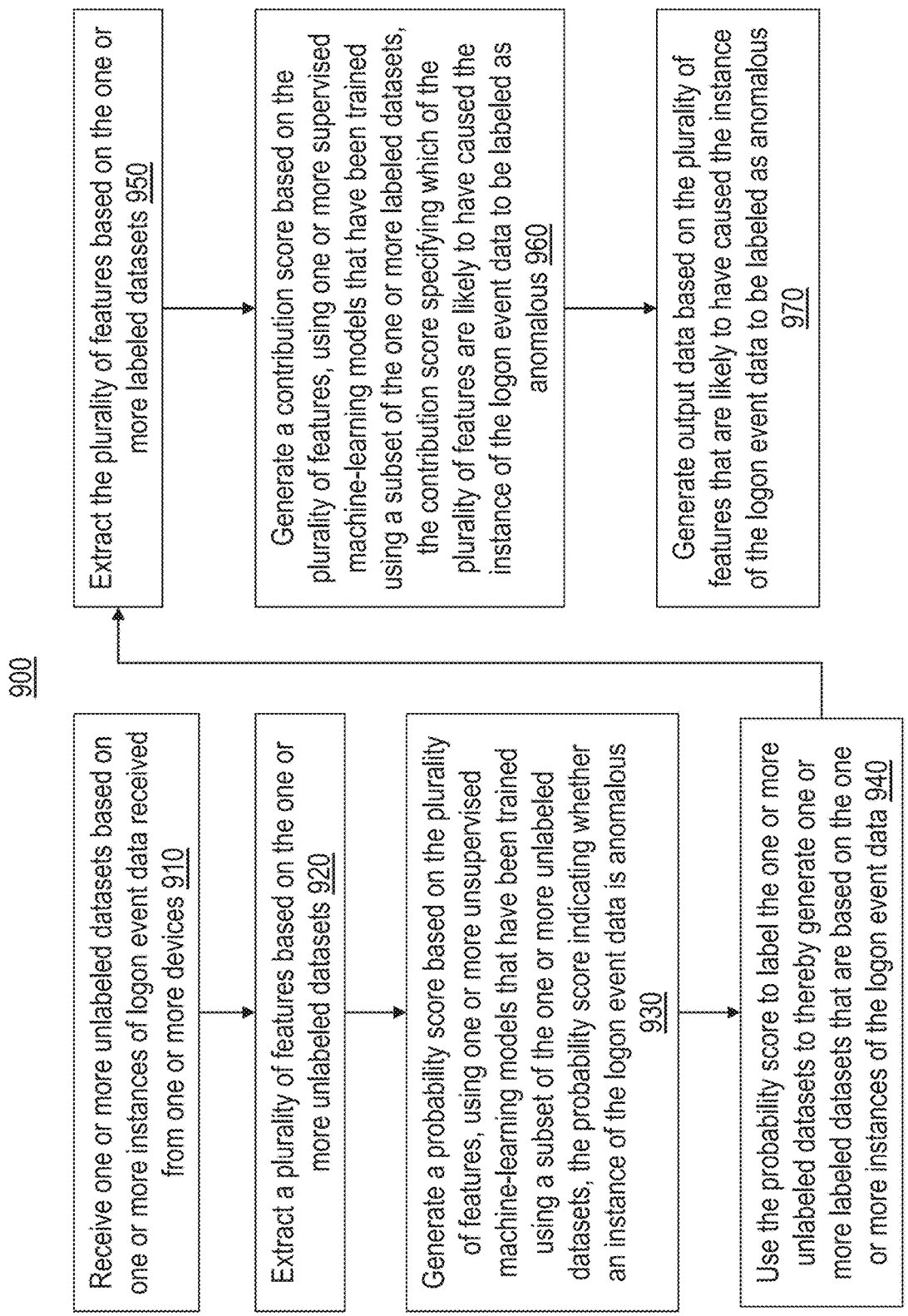
FIG. 9 illustrates a flowchart of an example method for using an unsupervised machine-learning model and a supervised learning-model to determine features related to the logon event data that cause instances of the logon data to be labeled as anomalous.

FIG. 9 illustrates a flowchart of an example method 900 for a computing system to use an unsupervised machine-learning model that receives unlabeled logon event data and generates labeled data indicative of an anomaly and a supervised learning-model that uses the labeled data as input to determine features related to the logon event data that cause instances of the logon data to be labeled as anomalous. The method 900 will be described with respect to one or more of the figures previously discussed.

The method 900 includes receiving one or more unlabeled datasets based on one or more instances of logon event data received from one or more devices (910). For example, as previously described the anomaly detector 140 receives the unlabeled datasets 131, 250 or 312 that are based on the logon event data 110A-113A received from the devices 110-113. In some embodiments, each instance of a logon event data 110A-113A is associated with a single user identification. In some embodiments the devices 110-113 are associated with single user identification. In some embodiments the devices 110-113 are associated with multiple user identifications.

The method includes extracting a plurality of features based on the one or more unlabeled datasets (920). For example, as previously described the feature extractor 320 extracts the features 252-256, 322 from the unlabeled datasets 131, 250 or 312. In some embodiments, the features may be (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, or (14) a location from where the logon occurs.

The method 900 includes generating a probability score based on the plurality of features, using one or more unsupervised machine-learning models that have been trained using a subset of the one or more unlabeled datasets, the probability score indicating whether an instance of the logon event data is anomalous (930). For example, as previously described the unsupervised machine-learning model 142 or 334 is trained using a subset of the unlabeled datasets 131, 250, or 312. The score generator 330 uses the trained unsupervised machine-learning model 142 or 334 to generate a probability score 332 for each instance of the logon event data based on the extracted features. The probability score 332 indicates whether each instance of the logon event data is anomalous or is normal, that is not anomalous.

The method 900 includes using the probability score to label the one or more unlabeled datasets to thereby generate one or more labeled datasets that are based on the one or more instances of the logon event data (940). For example, as previously described the label generator 340 labels each of the unlabeled datasets 131, 250, or 312 to generate labeled datasets 141, 342, or 550 having a label 557.

The method 900 includes extracting the plurality of features based on the one or more labeled datasets (950). For example, as previously described the feature extractor 620 extracts the features 252-256, 622 from the labeled datasets 141, 342, or 550 having the label 557.

The method 900 includes generating a contribution score based on the plurality of features, using one or more supervised machine-learning models that have been trained using a subset of the one or more labeled datasets, the contribution score specifying which of the plurality of features are likely to have caused the instance of the logon event data to be labeled as anomalous (960). For example, as previously described the supervised machine-learning model 152 or 634 is trained using a subset of the labeled datasets 141, 342, or 550 having the label 557. The score generator 630 uses the trained supervised machine-learning model 152 or 634 to generate a contribution score 632 for each instance of the logon event data based on the extracted features. The contribution score 632 specifies which of the extracted features are likely to have caused the instance of the logon event data to be labeled as anomalous.

The method 900 includes generating output data based on the plurality of features that are likely to have caused the instance of the logon event data to be labeled as anomalous (970). For example, as previously described the output module 160 generates the output data 161. In some embodiments, the output data 161 is a visualization such as the visualizations 400, 700, and 800 that show a visual indication of how likely each feature of the plurality of features is to have caused the instance of the logon event data to be labeled as anomalous or shows instances of anomalous and non-anomalous logon event data. In some embodiments, the visual indication is a cluster graph or a bar graph.

Figure 10:
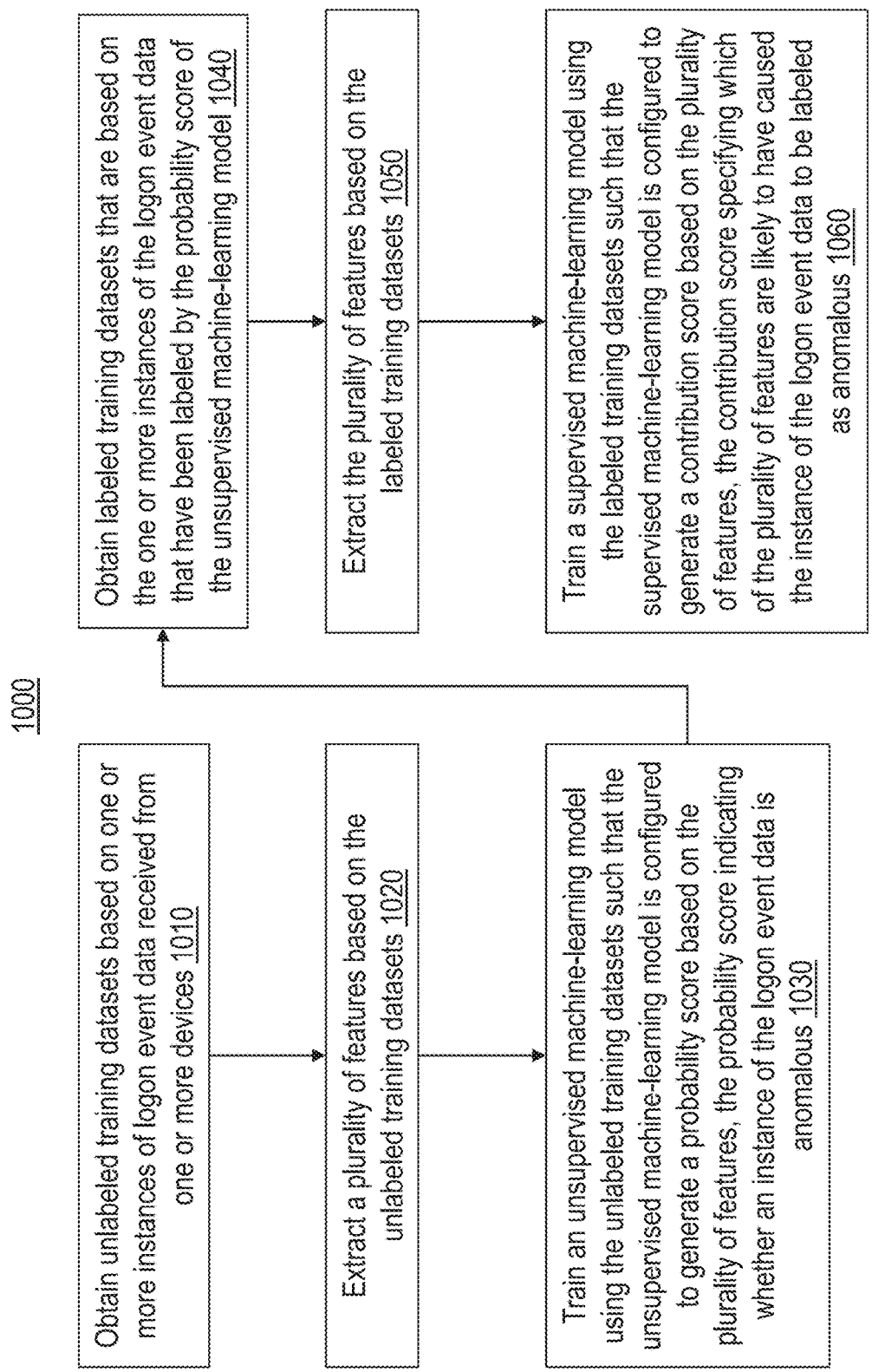
FIG. 10 illustrates a flowchart of an example method for training an unsupervised machine-learning model and a supervised learning-model to determine features related to the logon event data that cause instances of the logon data to be labeled as anomalous.

FIG. 10 illustrates a flowchart of an example method 1000 for training an unsupervised machine-learning model that receives unlabeled logon event data and generates labeled data indicative of an anomaly and for training a supervised learning-model that uses the labeled data as input to determine features related to the logon event data that cause instances of the logon data to be labeled as anomalous. The method 1000 will be described with respect to one or more of the figures previously discussed.

The method 1000 includes obtaining unlabeled training datasets based on one or more instances of logon event data received from one or more devices (1010). For example, as previously described the anomaly detector 140 receives the unlabeled training datasets 131, 210 or 250 that are based on the logon event data 110A-113A received from the devices 110-113. In some embodiments, each instance of a logon event data 110A-113A is associated with a single user identification. In some embodiments the devices 110-113 are associated with single user identification. In some embodiments the devices 110-113 are associated with multiple user identifications.

The method 1000 includes extracting a plurality of features based on the unlabeled training datasets (1020). For example, as previously described the feature extractor 220 extracts the features 252-256 from the unlabeled training datasets 131, 210 or 250. In some embodiments, the features may be (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, or (14) a location from where the logon occurs.

The method 1000 includes training an unsupervised machine-learning model using the unlabeled training datasets such that the unsupervised machine-learning model is configured to generate a probability score based on the plurality of features, the probability score indicating whether an instance of the logon event data is anomalous (1030). For example, as previously described the unsupervised machine-learning model 142, 240, or 334 is trained by the machine-learning module 230 using a subset of the unlabeled training datasets 131, 210 or 250. This training causes the trained unsupervised machine-learning model 142, 240, or 334 to be configured to generate a probability score 332 for each instance of the logon event data based on the extracted features. The probability score 332 indicates whether each instance of the logon event data is anomalous or is normal, that is not anomalous.

The method 1000 includes obtaining labeled training datasets that are based on the one or more instances of the logon event data that have been labeled by the probability score of the unsupervised machine-learning model (1040). For example, as previously described the label generator 340 labels each of the unlabeled training datasets 131, 210 or 250 to generate labeled training datasets 141, 510, or 550 having a label 557.

The method 1000 includes extracting the plurality of features based on the labeled training datasets 141, 510, or 550 having a label 557 (1050). For example, as previously described the feature extractor 520 extracts the features 252-256 from the labeled training datasets 141, 510, or 550 having a label 557.

The method 1000 includes training a supervised machine-learning model using the labeled training datasets such that the supervised machine-learning model is configured to generate a contribution score based on the plurality of features, the contribution score specifying which of the plurality of features are likely to have caused the instance of the logon event data to be labeled as anomalous (1060). For example, as previously described the supervised machine-learning model 152, 540, or 634 is trained by the machine-learning module 530 using a subset of the labeled training datasets 141, 510, or 550 having a label 557. This training causes the trained supervised machine-learning model 152, 540, or 634 to be configured to generate a contribution score 632 for each instance of the logon event data based on the extracted features. The contribution score 632 specifies which of the extracted features are likely to have caused the instance of the logon event data to be labeled as anomalous.

Finally, because the principles described herein may be performed in the context of a computing system some introductory discussion of a computing system will be described with respect to FIG. 11. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 11:
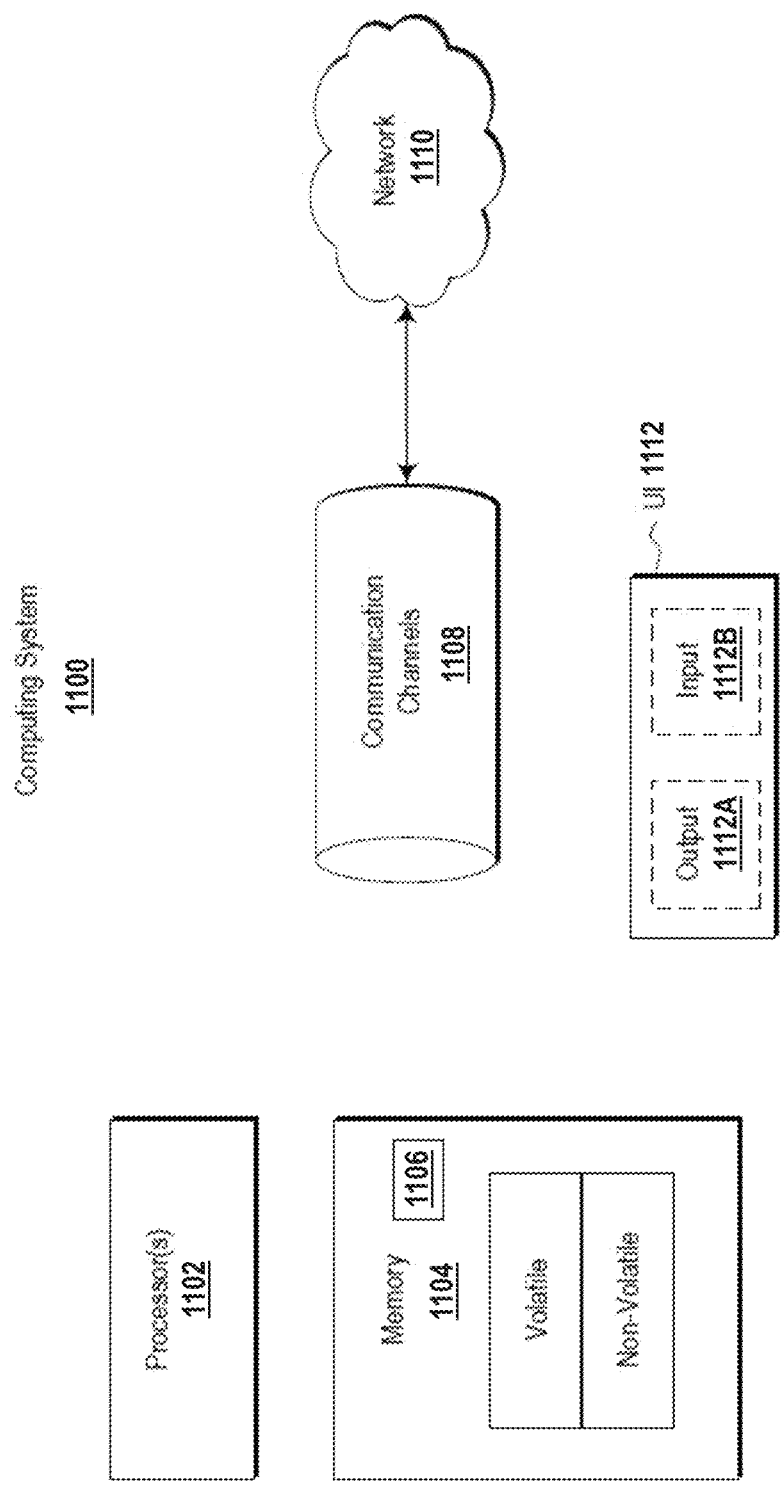
FIG. 11 illustrates an example computing system in which the embodiment described herein may be employed.

As illustrated in FIG. 11, in its most basic configuration, a computing system 1100 typically includes at least one hardware processing unit 1102 and memory 1104. The processing unit 1102 may include a general-purpose processor and may also include a field-programmable gate array (FPGA), an application-specific integrated circuit (ASIC), or any other specialized circuit. The memory 1104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1100 also has thereon multiple structures often referred to as an "executable component". For instance, memory 1104 of the computing system 1100 is illustrated as including executable component 1106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1104 of the computing system 1100. Computing system 1100 may also contain communication channels 1108 that allow the computing system 1100 to communicate with other computing systems over, for example, network 1110.

While not all computing systems require a user interface, in some embodiments, the computing system 1100 includes a user interface system 1112 for use in interfacing with a user. The user interface system 1112 may include output mechanisms 1112A as well as input mechanisms 1112B. The principles described herein are not limited to the precise output mechanisms 1112A or input mechanisms 1112B as such will depend on the nature of the device. However, output mechanisms 1112A might include, for instance, speakers, displays, tactile output, holograms, and so forth. Examples of input mechanisms 1112B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 1100 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 1102 and memory 1104, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system including an unsupervised machine-learning model that receives unlabeled logon event data and generates labeled logon event data indicative of an anomaly and a supervised learning-model that uses the labeled logon event data as input to determine features related to the logon event data that cause instances of the logon event data to be labeled as anomalous, the computing system comprising:
    one or more processors; and
    one or more computer-readable hardware storage devices having stored thereon computer-executable instructions that are structured such that, when executed by the one or more processors, the computer-executable instructions cause the computing system to perform at least:
        receive one or more unlabeled datasets comprising one or more instances of logon event data received from one or more devices, each instance of logon event data comprising an ID of a logon device and one or more features associated with that logon event;
        extract a plurality of features from the one or more instances of logon event data of the one or more unlabeled datasets;
        generate a probability score for the each instance of logon event data based on the extracted plurality of features, using one or more unsupervised machine-learning models that have been trained using a subset of the one or more unlabeled datasets, the probability score indicating whether the each instance of the logon event data is anomalous;
        use the probability score to label the each instance of logon event data within the one or more unlabeled datasets to thereby generate one or more labeled datasets that are based on the one or more instances of the logon event data;
        extract a second plurality of features from the one or more labeled datasets;
        generate a contribution score for each of the extracted second plurality of features associated with the label given to the each instance of the logon event data, using one or more supervised machine-learning models that have been trained using a subset of the one or more labeled datasets, the contribution score specifying which of the plurality of features are likely to have caused the each instance of the logon event data to be labeled as anomalous; and
        generate output data based on the plurality of features that are likely to have caused the instance of the logon event data to be labeled as anomalous.

2. The computing system of claim 1, wherein the computer-executable instructions cause the computing system to further perform:
    use the output data to determine if the logon event data that has been labeled as anomalous is malicious or benign.

3. The computing system of claim 1, wherein the plurality of features comprise one or more of (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, or (14) a location from where the logon occurs.

4. The computing system of claim 1, wherein the output data comprises a visualization that shows a visual indication of how likely each feature of the plurality of features is to have caused the instance of the logon event data to be labeled as anomalous or shows instances of anomalous and non-anomalous logon event data.

5. The computing system of claim 4, wherein the visual indication is one of a cluster graph or a bar graph.

6. The computing system of claim 1, wherein each instance of the logon event data is associated with a single user identification.

7. The computing system of claim 1, wherein the one or more devices are associated with a single user identification.

8. The computing system of claim 1, wherein the one or more devices are associated with multiple user identifications.

9. A computing system including an unsupervised machine-learning model that receives unlabeled logon event data and generates labeled logon event data indicative of an anomaly and a supervised learning-model that uses the labeled logon event data as input to determine features related to the logon event data that cause instances of the logon event data to be labeled as anomalous, the computing system comprising:

one or more processors; and
one or more computer-readable hardware storage devices having stored thereon computer-executable instructions that are structured such that, when executed by the one or more processors, the computer-executable instructions cause the computing system to perform at least:
obtain one or more unlabeled training datasets comprising one or more instances of logon event data received from one or more devices, each instance of logon event data comprising an ID of a logon device and one or more features associated with that logon event;
extract a plurality of features from the one or more instances of logon event data of the unlabeled training datasets;
train an unsupervised machine-learning model using the unlabeled training datasets such that the unsupervised machine-learning model is configured to generate a probability score for an instance of the logon event data based on the plurality of features, the probability score indicating whether the instance of the logon event data is anomalous;
obtain labeled training datasets that are based on the one or more instances of the logon event data that have been labeled by the probability score of the unsupervised machine-learning model;
extract a second plurality of features based on the labeled training datasets; and
train a supervised machine-learning model using the labeled training datasets such that the supervised machine-learning model is configured to generate a contribution score based on the plurality of features, the contribution score specifying which of the second plurality of features are likely to have caused a particular instance of the logon event data to be labeled as anomalous.

10. The computing system of claim 9, wherein the plurality of features comprise one or more of (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, (14) a location from where the logon occurs, or (15) whether a new IP host or service was used at the logon time.

11. The computing system of claim 9, wherein each instance of the logon event data is associated with a single user identification.

12. The computing system of claim 9, wherein the one or more devices are associated with a single user identification.

13. The computing system of claim 9, wherein the one or more devices are associated with multiple user identifications.

14. A method for a computing system to use an unsupervised machine-learning model that receives unlabeled logon event data and generates labeled logon event data indicative of an anomaly and a supervised learning-model that uses the labeled logon event data as input to determine features related to the logon event data that cause instances of the logon event data to be labeled as anomalous, the method comprising:

receiving one or more unlabeled datasets comprising one or more instances of logon event data received from one or more devices, each instance of logon event data comprising an ID of a logon device and one or more features associated with that logon event;
extracting a plurality of features from the one or more instances of logon event data of the one or more unlabeled datasets;
generating a probability score for the each instance of logon event data based on the extracted plurality of features, using one or more unsupervised machine-learning models that have been trained using a subset of the one or more unlabeled datasets, the probability score indicating whether the each instance of the logon event data is anomalous;
using the probability score to label the each instance of logon event data within the one or more unlabeled datasets to thereby generate one or more labeled datasets that are based on the one or more instances of the logon event data;
extracting a second plurality of features from the one or more labeled datasets;
generating a contribution score for each of the extracted second plurality of features associated with the label given to the each instance of the logon event data, using one or more supervised machine-learning models that have been trained using a subset of the one or more labeled datasets, the contribution score specifying which of the plurality of features are likely to have caused the instance of the logon event data to be labeled as anomalous; and
generating output data based on the plurality of features that are likely to have caused the instance of the logon event data to be labeled as anomalous.

15. The method of claim 14, further comprising:
using the output data to determine if logon event data that has been labeled as anomalous is malicious or benign.

16. The method of claim 14, wherein the plurality of features comprise one or more of (1) a device name or identification, (2) an indication of a successful or unsuccessful logon, (3) an IP address from where the logon occurred, (4) a number of times a logon is successful or unsuccessful, (5) an account name, (6) an organization name, (7) a day of a week the logon occurred, (8) a time of a day the logon occurred, (9) an owner type, (10) a service type, (11) a domain type, (12) an operating system of the device, (13) whether this is a first logon attempt, (14) a location from where the logon occurs, or (15) whether a new IP host or service was used at the logon time.

17. The method of claim 14, wherein the output data comprises a visualization that shows a visual indication of how likely each feature of the plurality of features is to have caused the instance of the logon event data to be labeled as anomalous or shows instances of anomalous and non-anomalous logon event data.

18. The method of claim 14, wherein each instance of a logon event data is associated with a single user identification.

19. The method of claim 14, wherein the one or more devices are associated with a single user identification.

20. The method of claim 14, wherein the one or more devices are associated with multiple user identifications.

* * * * *